United States Patent [19]

Sengul et al.

[11] Patent Number: 4,694,904

[45] Date of Patent: Sep. 22, 1987

[54] CYCLIC FLOODING OF A NATURALLY-FRACTURED FORMATION

[75] Inventors: M. Marc Sengul; Steven B. Hinchman, both of Littleton, Colo.

[73] Assignee: Marathon Oil Company, Findlay, Ohio

[21] Appl. No.: 892,524

[22] Filed: Jul. 31, 1986

[51] Int. Cl.$^4$ .............. E21B 43/22; E21B 47/00
[52] U.S. Cl. .................. 166/252; 166/263; 166/273; 166/274
[58] Field of Search .......... 166/252, 263, 271, 273, 166/274, 281

[56] References Cited

U.S. PATENT DOCUMENTS

| | | | |
|---|---|---|---|
| 3,018,826 | 1/1962 | Sandiford | 166/273 |
| 3,199,586 | 8/1965 | Henderson et al. | 166/271 X |
| 3,349,843 | 10/1967 | Huitt | 166/281 X |
| 3,525,396 | 8/1970 | Chew | 166/274 X |
| 3,637,016 | 1/1972 | Holm | 166/273 |
| 3,648,772 | 3/1972 | Earlougher, Jr. | 166/274 X |
| 3,770,056 | 11/1973 | Campbell et al. | 166/273 |
| 3,811,506 | 5/1974 | Carlin | 166/274 |
| 4,265,311 | 5/1981 | Ely | 166/271 |
| 4,266,611 | 5/1981 | Bousaid et al. | 166/273 |
| 4,342,484 | 8/1982 | Davidson et al. | 166/271 X |

OTHER PUBLICATIONS

Elkins, L. F., et al, "Cyclic Water Flooding the Spraberry Utilizes End Effects to Increase Oil Production Rate," Journal of Petroleum Technology, Aug. 1963, pp. 877-884.

*Primary Examiner*—George A. Suchfield
*Attorney, Agent, or Firm*—Jack L. Hummel; Rodney F. Brown

[57] ABSTRACT

Two fluids having different mobilities are sequentially injected in repeating cycles into a naturally-fractured subterranean oil-bearing formation to facilitate oil recovery therefrom. The first fluid is a mobility adjusted fluid containing a mobility control agent which imparts reduced mobility to the fluid. The mobility adjusted fluid displaces oil from the formation fractures to a production well. The second fluid has a higher mobility than the first fluid which enables it to displace oil from the formation matrix to the formation fractures. The cycle is repeated to produce the newly displaced oil in the fractures.

15 Claims, 1 Drawing Figure

CYCLIC FLOODING OF A NATURALLY-FRACTURED FORMATION

BACKGROUND OF THE INVENTION

1. Technical Field:

The invention relates to a process for recovering oil from a subterranean oil-bearing formation and more particularly to a process for cyclic flooding of an oil-bearing formation to recover oil therefrom.

2. Description of Related Art:

Water flooding is a well known method for recovering oil from subterranean oil-bearing formations. Water flooding relies primarily on an immiscible displacement mechanism to recover oil from the formation. See Elkins, L. F., et al, "Cyclic Water Flooding the Spraberry Utilizes End Effects to Increase Oil Production Rate," Journal of Petroleum Technology, August 1963, pp 877–884.

Water flooding is not an entirely satisfactory oil recovery method because in certain formations the flood channels through more permeable zones of the formation and bypasses the less permeable zones, leaving oil unrecovered therein. Polymer is commonly added to a water flood to remedy this problem. A polymer augmented water flood can improve the mobility characteristics of the flood and improve oil displacement from the less permeable zones of the formation. Unfortunately, the use of polymer substantially increases the cost of the flooding fluid. Problems attendant upon the continuous use of polymer also include reduced fluid injectivity due to the low mobility of the polymer and an increased risk of face plugging at the wellbore.

A process is needed which effectively recovers oil at a reduced material cost in comparison to conventional polymer augmented water flooding. Further, a process is needed which can mitigate injectivity problems attendant upon many conventional polymer augmented water floods.

SUMMARY OF THE INVENTION

The present invention is a process for recovering oil from a naturally-fractured oil-bearing formation. A sequence of two fluid slugs having different mobilities are cyclically injected into the formation. The first fluid is a mobility adjusted fluid. It contains a mobility control agent which downwardly adjusts the mobility of the fluid. The sequence is initiated by injecting a slug of the first fluid into the formation. The relatively low mobility of the first fluid enables it to flow into the fractures of the formation, but limits its ability to flow into the matrix of the formation. Thus, the injected slug preferentially flows into the fractures of the formation and displaces oil therefrom.

The second fluid has a substantially higher mobility than the first fluid because the mobility of the second fluid is not downwardly adjusted to the degree of the first fluid. A slug of the second fluid is injected into the formation after the first fluid and flows into the fractures of the formation. The higher mobility of the second fluid and improved contacting between the second fluid and the matrix at the fracture faces, which result from the preceding displacement of oil from the fracture faces by the first fluid, enable the second fluid to flow into the formation matrix to a much greater extent than the first fluid. Thus, a significant portion of the second fluid slug penetrates the formation matrix and displaces oil from the matrix into the fractures.

The cycle is started anew after injection of the second fluid slug with another sequential injection of slugs of the first and second fluids. The cycle is repeated as often as desired until the oil production reaches its economic limit.

The process is particularly advantageous from a cost-effectiveness standpoint because it recovers oil in volumes comparable to a conventional polymer augmented water flood, but with a substantially lower use of mobility adjusted fluid. The mobility adjusted fluid requirement is reduced in the present invention because the mobility adjusted fluid is injected into the formation in an alternating sequence with the second fluid rather than continuously throughout the process. A further reduction in the mobility adjusted fluid requirement is realized because each cycle only requires a mobility adjusted fluid slug of sufficient volume to sweep the fracture pore volume. In contrast, the slug volume of a polymer augmented water is commonly based on the substantially larger total pore volume of the formation.

The present process is operationally advantageous because it does not promote injectivity loss to the same degree as observed in many polymer augmented water floods. This obviates the need to periodically interrupt the operation of injection wells for remedial treatment of the well as is often necessary in conventional polymer augmented water floods.

BRIEF DESCRIPTION OF THE DRAWING

The drawing plots oil recovery as a function of fluid volume injected into the formation.

DESCRIPTION OF PREFERRED EMBODIMENTS

Figure 1:
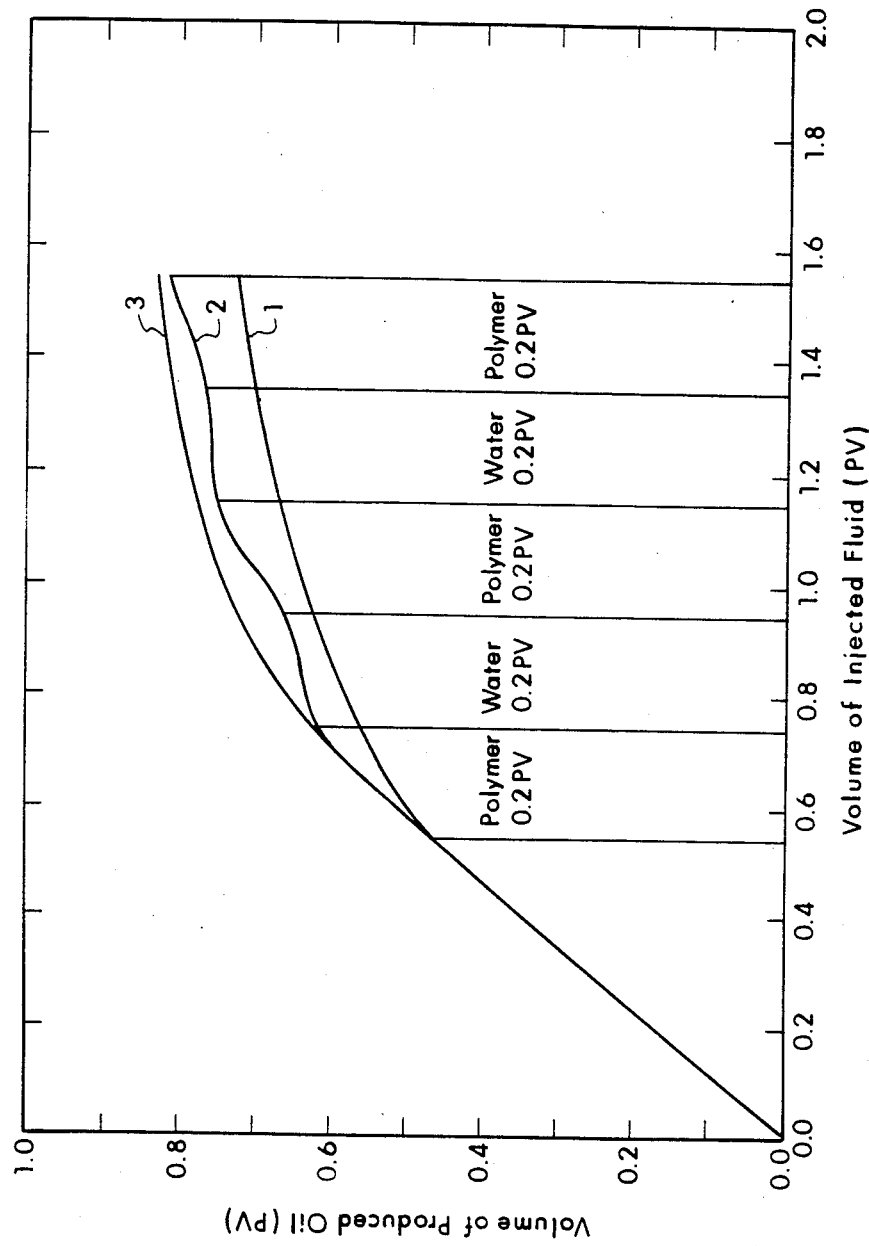

The present invention is a cyclic flooding process applied to a naturally-fractured subterranean oil-bearing formation in communication with at least one injection well and at least one production well. As defined herein a "naturally-fractured formation" is a subterranean formation having a connective fracture network which surrounds and at least partially isolates matrix blocks in the formation. A "cycle" is defined herein as the separate and sequential injection of one slug of a first fluid and one slug of a distinct second fluid into the formation via at least one injection well while concurrently producing fluids from at least one production well in communication with the injection well.

In practicing one embodiment of the present invention, cyclic flooding is applied to the formation after conventional primary and secondary (i.e., water flooding) recovery means are exhausted. Cyclic flooding is initiated as soon as an oil production decline is observed in the water flood. In practicing an alternative embodiment, cyclic flooding is applied to the formation immediately after primary recovery without intermediate water flooding. The first embodiment is generally preferred as a more cost-effective application of the present invention, although specific formation conditions may dictate applying the alternate embodiment.

In any case, the cyclic flooding process employs two sequentially injected fluids. The first fluid is a mobility adjusted fluid. It contains a mobility control agent which imparts a relatively low mobility to the fluid. Specifically, the mobility of the first fluid is downwardly adjusted by means of the mobility control agent such that the fluid has a high transmissibility in the formation fracture network, yet substantially resists flowing into the formation matrix when in the fracture network.

The mobility control agent may be any species which imparts reduced mobility properties to the fluid. For example, the mobility adjusted fluid may be an aqueous polymer solution. Exemplary polymers include polyacrylamide or partially hydrolyzed polyacryamide. Alternatively, the mobility adjusted fluid may be a foam. The exact composition and concentration of the mobility adjusted fluid used herein is readily determined by routine experimentation known to those of ordinary skill in the art, such as core flooding.

A slug of the first fluid is injected into an injection well penetrating the naturally-fractured formation. The slug sweeps the fracture network and displaces oil contained therein toward an oil production well where it is produced to the surface. The first fluid is injected continuously into the injection well while the oil production rate is simultaneously monitored at the production well. Injection of the first fluid is preferably terminated when oil production stabilizes at a constant level. Generally the slug volume required to stabilize production is equivalent to about one fracture pore volume of the formation, although this volume may vary among formations of differing character. Typically, however, the fracture pore volume is only a small fraction of the total pore volume of the formation.

A slug of the second fluid is injected via the injection well into the formation after injection of the first fluid slug. Injection of the second fluid slug may be beneficially delayed in some formations by a shut-in period after injection of the first fluid slug. Alternatively, injection of the second fluid slug is begun immediately upon terminating injection of the first fluid slug.

The second fluid has a substantially higher mobility than the first fluid such that it is less resistant to flow into the matrix than the first fluid. The second fluid may be a fluid which does not contain a mobility control agent or contains a lower concentration of the agent than the first fluid. The second fluid is preferably water. The second fluid may also contain additives which improve its oil displacement ability without substantially lowering its mobility, such as a surfactant.

The second and/or first fluid may also contain an agent which chemically treats fracture faces of the formation in a manner which facilitates flow of the second injected fluid across the fracture faces into the formation matrix where the bulk of the oil in place resides. The chemical agent may be the same component as the mobility control agent or it may be a separate and distinct component.

The second fluid is continuously injected into the injection well in the same manner as the first fluid. The second fluid slug flows into the matrix and displaces oil therefrom to a substantially greater extent than the first fluid slug. Injection of the second fluid is preferably terminated when the ratio of the second fluid to oil in the produced fluids at the monitored production well surpasses an acceptable level. The volume of the second fluid slug, which can be injected before unacceptable levels of the second fluid are produced, can be less than or equal to the volume of the first fluid slug, but is preferably substantially larger. Typically up to two fracture pore volumes or more of the second fluid are injected in a single slug.

The cycle of injecting sequential slugs of the two fluids is repeated as often as necessary until the oil production reaches its economic limit. Any cycle may be interrupted by a shut-in period or the cycles may be repeated continuously without a shut-in period. The volume of the repeating slugs is often constant, but it may be varied based on the performance parameters of the flood. For example, the volume of successive second fluid slugs may advantageously be tapered with each injection cycle.

Although the exact mechanism is not known, it is believed that once in the formation the first fluid preferentially enters the formation fractures and displaces oil therefrom to the production well by a viscous displacement mechanism. The second fluid upon injection initially enters the fractures and displaces the first fluid occupying the fractures by a miscible displacement mechanism. The second fluid thereafter enters the matrix and displaces oil therefrom into the fractures predominantly by an imbibition mechanism. To a much lesser extent, gravity and viscous displacement mechanisms may also contribute to displacement of oil from the matrix by the second fluid.

Effective displacement of oil from the formation fractures by the first fluid is believed to significantly enhance the imbibition mechanism of the second fluid. The second fluid is able to contact a greater surface area of the matrix at the fracture faces if oil is effectively swept from the fractures by the first fluid than if a relatively large volume of oil remains in the fractures. As a rule, the greater the area of the matrix surface the second fluid contacts, the greater the volume of oil the second fluid displaces from the matrix. After the second fluid displaces oil into the fractures from the matrix, the oil in the fractures can once again be displaced to the production well by a first fluid slug injected in the next cycle.

The mechanism recited above renders the process particularly applicable to naturally-fractured formations wherein the imbibition forces are substantially greater than the viscous forces with respect to fluids in the formation. Formations of this type include formations having a high fracture intensity and having matrix blocks of small volume.

The following example demonstrates the practice and utility of the present invention, but is not to be construed as limiting the scope thereof.

EXAMPLE

Oil is produced by three different recovery processes from separate noncommunicative injection/production well systems in formations having the following common properties:

| | Thickness = 30.5 m | |
|---|---|---|
| Matrix | | Fracture |
| Compressibility = 5.8 × $10^{-10}$ $Pa^{-1}$ | | Compressibility = 1.2 × $10^{-9}$ $Pa^{-1}$ |
| Permeability = 100 md | | Permeability = 100,000 md |
| Porosity = 0.13 | | Porosity = 0.02 |

Each recovery process is operated under identical conditions except for the composition of the displacement fluid.

In process 1, oil is produced by a conventional water flood. In process 3, oil is produced by a conventional polymer augmented water flood. Finally, in process 2, oil is produced by the cyclic flooding process of the present invention.

In each case the volume of oil produced is recorded as a function of the volume of displacement fluid injected. The same total volume of displacement fluid is injected in all cases. The results are shown by three curves in FIG. 1. The numbers labelling the curves correspond to the above-recited process numbers.

Each of the three processes is initiated by conventional water flooding. Water flooding continues in each of the processes until about 0.53 pore volumes of water are injected. At this point a production decline occurs and injection of aqueous polymer solution is initiated in processes 2 and 3. This is the point on the figure where curves 2 and 3 diverge from curve 1. Water flooding is continued in process 1.

Curves 2 and 3 coincide throughout the injection of the first 0.2 pore volumes of the aqueous polymer solution. At this point, i.e., after about 0.2 pore volumes of aqueous polymer solution or about 0.73 pore volumes of total fluid are injected, a production decline occurs and water injection is initiated in process 2 while polymer injection is continued in process 3. This point is located on the figure where curves 2 and 3 first diverge from one another. The injection of water is the second sequence in the first cycle of process 2. Each injection sequence of process 2 is denoted by segmenting curve 2 with vertical lines on the figure. The slug volume of every sequence is 0.2 total pore volumes of the formation. In all, two and one-half cycles of process 2 are completed.

It is apparent from the figure that the polymer flood of process 3 and the cyclic flood of process 2, i.e., the present invention, produce substantially more oil than the water flood of process 1. Furthermore, process 2 produces almost the same amount of oil as the polymer flood of process 3 while using about 40% less polymer than process 3.

While the foregoing preferred embodiments of the invention have been described and shown, it is understood that the alternatives and modifications, such as those suggested and others, may be made thereto and follow in the scope of the invention.

We claim:

1. A process for recovering oil from a subterranean formation having an oil-bearing connective natural fracture network and oil-bearing matrix blocks, both in fluid communication with an injection well and a production well, the process comprising:
   (a) adjusting the mobility of a fluid such that said mobility adjusted fluid substantially flows in said natural fracture network, but does not substantially flow into said matrix blocks upon injection into said natural fracture network;
   (b) injecting said mobility adjusted fluid into said natural fracture network via said injection well to displace the oil in said natural fracture network toward said production well;
   (c) thereafter sequentially injecting a second fluid having a substantially higher mobility than said mobility adjusted fluid into said natural fracture network via said injection well to displace said mobility adjusted fluid toward said production well;
   (d) conveying said second fluid into said matrix blocks to displace the oil therein into said natural fracture network; and
   (e) recovering the displaced oil from said formation via said production well.

2. The process of claim 1 wherein said sequential injection of said mobility adjusted fluid and said second fluid is one cycle and said cycle is repeated at least once.

3. The process of claim 1 wherein said mobility adjusted fluid is an aqueous polymer solution.

4. The process of claim 3 wherein said polymer in said aqueous solution is selected from the group consisting of partially hydrolyzed polyacrylamide, polyacrylamide and mixtures thereof.

5. The process of claim 1 wherein said higher mobility second fluid is substantially water.

6. The process of claim 1 wherein said higher mobility second fluid is an aqueous surfactant solution.

7. The process of claim 1 wherein said injection of said mobility adjusted fluid is terminated when an oil production decline is detected at said production well.

8. The process of claim 7 wherein said injection of said second fluid is initiated immediately upon termination of said injection of said mobility adjusted fluid.

9. The process of claim 7 wherein said injection of said second fluid is initiated after a shut-in period commencing upon termination of said injection of said mobility adjusted fluid.

10. The process of claim 1 wherein said mobility adjusted fluid is a foam.

11. The process of claim 2 wherein said cycle is repeated continuously until oil production reaches an economic limit.

12. The process of claim 1 wherein the volume of said mobility adjusted fluid injected into said natural fracture network is substantially equal to the fracture pore volume of said formation.

13. The process of claim 1 wherein the volume of said second higher mobility fluid injected into said natural fracture network is substantially greater than the volume of said mobility adjusted fluid injected into said natural fracture network.

14. The process of claim 13 wherein the volume of said second higher mobility fluid injected into said natural fracture network is at least two times greater than the fracture pore volume of said formation.

15. A process for recovering oil from a subterrarean formation having an oil-bearing connective natural fracture network and oil-bearing matrix blocks, both in fluid communication with an injection well and a production well, the process comprising:
   (a) adjusting the mobility of an aqueous solvent by adding a polymer thereto to form an aqueous polymer solution such that said aqueous polymer solution substantially flows in said natural fracture network, but does not substantially flow into said matrix blocks upon injection into said natural fracture network;
   (b) injecting a first slug comprising said aqueous polymer solution into said natural fracture network via said injection well to displace the oil in said natural fracture network toward said production well;
   (c) thereafter sequentially injecting a second slug comprising water having a substantially higher mobility than said aqueous polymer solution into said natural fracture network via said injection well to displace said aqueous polymer solution toward said production well;
   (d) conveying at least a portion of said second slug into said matrix blocks to displace the oil therein into said natural fracture network; and
   (e) recovering the displaced oil from said formation via said production well.

* * * * *